Jan. 5, 1960 R. A. KARHAN 2,919,847
OIL SYSTEMS FOR REFRIGERANT COMPRESSORS
Filed May 2, 1955 2 Sheets-Sheet 1
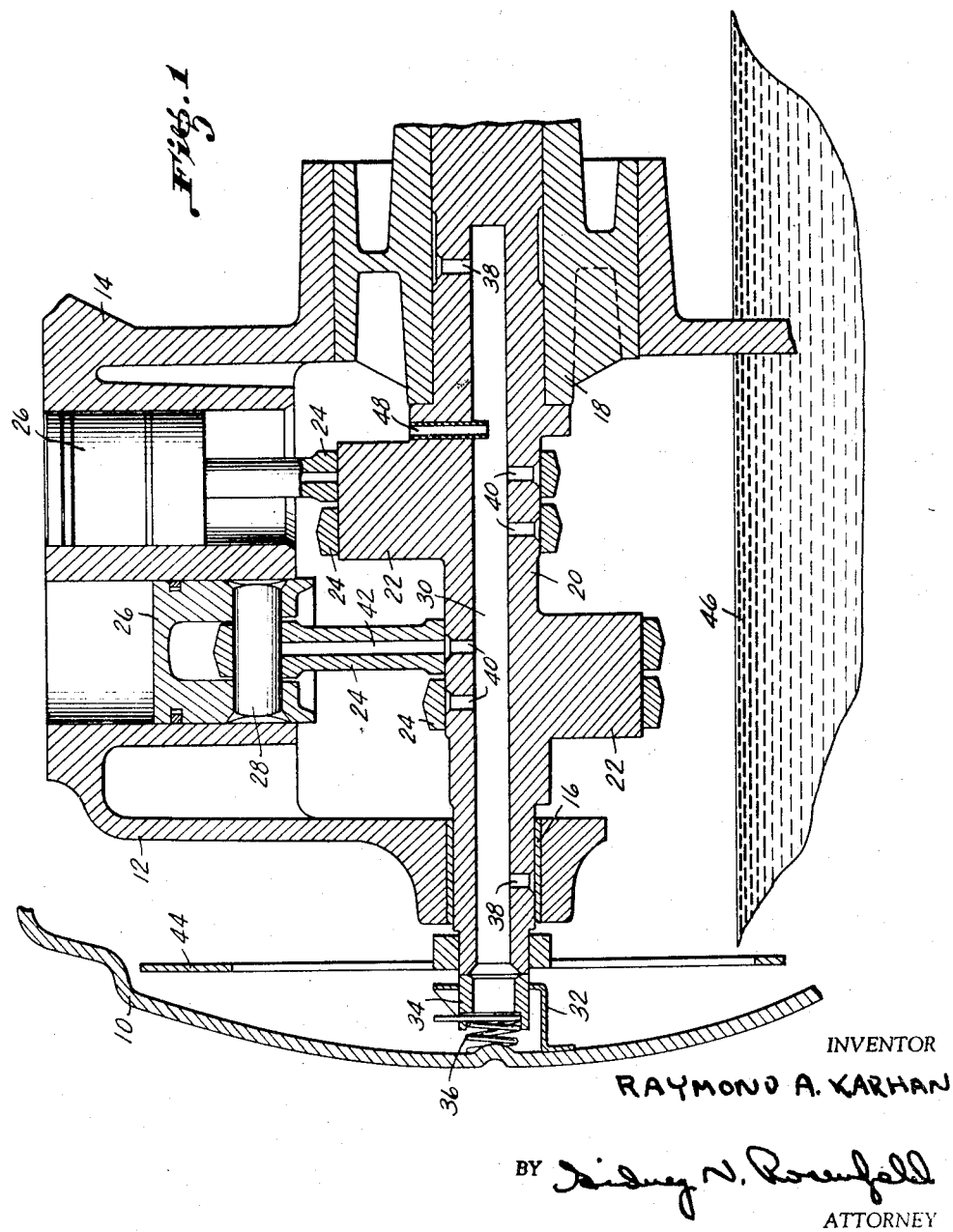
INVENTOR
RAYMOND A. KARHAN
BY
ATTORNEY

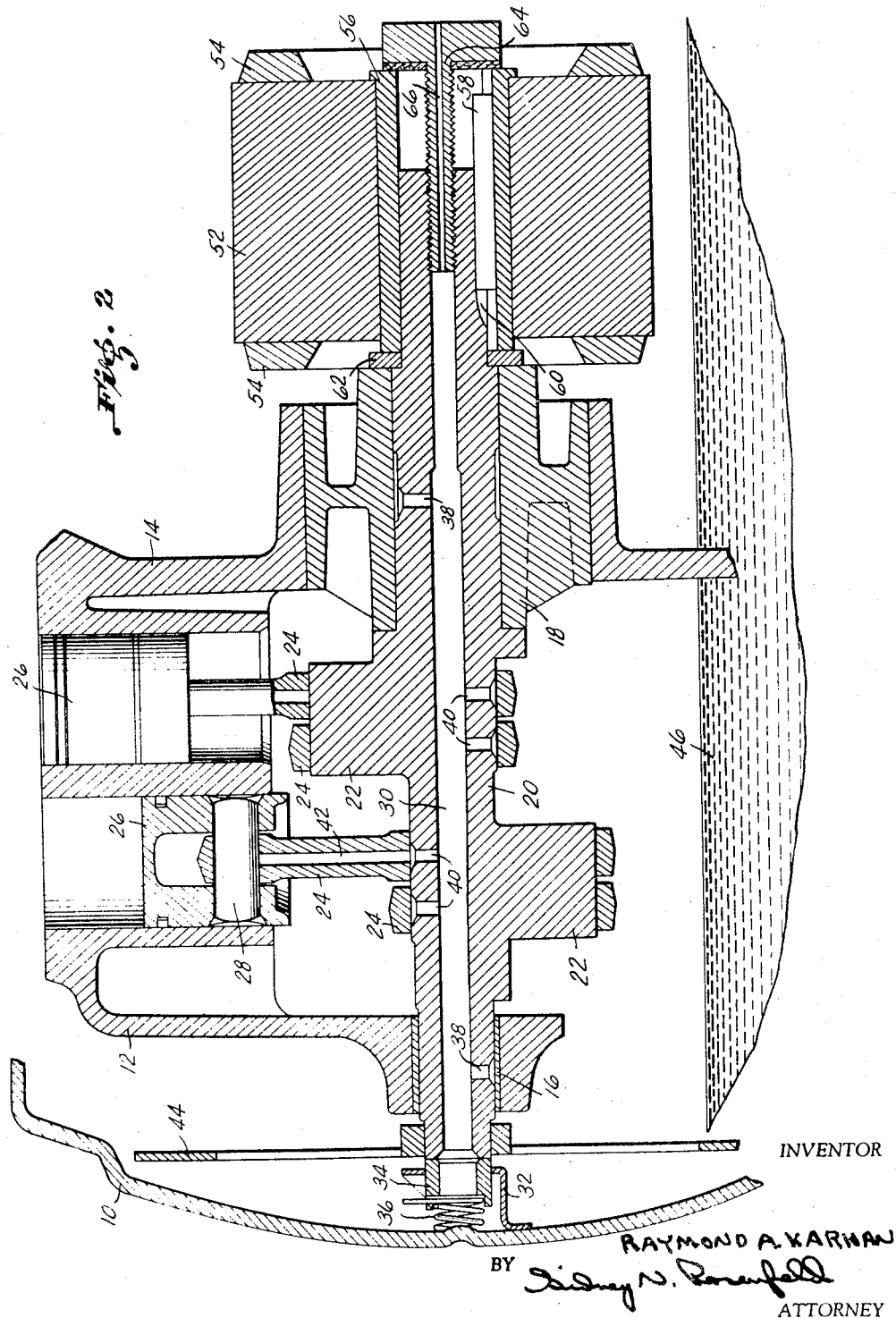

United States Patent Office 2,919,847
Patented Jan. 5, 1960

2,919,847

OIL SYSTEMS FOR REFRIGERANT COMPRESSORS

Raymond A. Karhan, Dover, Pa., assignor, by mesne assignments, to Borg-Warner Corporation, Chicago, Ill., a corporation of Illinois Application May 2, 1955, Serial No. 505,244

1 Claim. (Cl. 230—206)

This invention relates to reciprocating refrigerant compressors and more particularly to refrigerant compressors utilizing a gravity flow of lubricant to the bearings through the drive shaft.

In such compressors, the drive shaft is supported for rotation by spaced bearings and serves to impart reciprocatory motion to one or more pistons. It is necessary to supply a lubricant to the various bearing surfaces. This has been customarily done by providing the drive shaft with an axial lubricant receiving bore extending to a point just beyond the furthermore bearing surface. A series of radial ports is also provided, each such port communicating with a bearing surface. The lubricant flows by gravity to the axial bore and is then forced therefrom through the radial ports of the various bearing surfaces by centrifugal force created by the rotation of the drive shaft.

I have discovered that the oil flow through the various ports has been progressively decreased as the oil traversed the axial bore from the inlet to the end thereof. I have found that this was caused by a gas pocket being formed in the bore adjacent its closed end and extending back toward the inlet end. This gas pocket opposed the flow of oil through the bore thereby cutting down the oil flow through the ports and materially shortening the bearing life. This gas was substantially prevented from escaping from the bore via the oil delivery ports by the flow of oil therethrough.

It is well known that most refrigerants are freely miscible with oil. Therefore, the oil flowing to the axial bore is in reality a mixture of oil and refrigerant. The refrigerant is picked up by the oil by direct absorption and by entrainment through churning of the oil. As the oil flows through the axial bore, centrifugal action separates the entrained refrigerant while bearing heat evaporates the absorbed refrigerant. It can be easily visualized that more and more refrigerant is released from the oil as the mixture flows through the bore forming the aforementioned gas pocket.

I have discovered that by providing a vent which communicates with the interior of the bore adjacent the closed end thereof, the gas is vented therefrom and the flow of oil through the various ports has been greatly increased. In fact, flow of oil through the port next adjacent the closed end of the bore has been increased eightfold. Further, since the oil is confined to the periphery of the rotating shaft by centrifugal action, it does not escape through the vent.

It is an object of this invention to improve the lubrication system of a refrigerant compressor.

It is a further object to increase oil flow through the axial bore of a rotating drive-shaft of a refrigerant compressor by venting refrigerant gases therefrom.

It is yet another object to increase oil flow through the axial bore of a rotating refrigerant compressor drive-shaft by venting refrigerant gases therefrom as rapidly as they are formed.

In the drawings:

Figure 1 is a vertical sectional view of a preferred embodiment of the invention, with parts thereof in elevation; and Figure 2 is a similar view of a second embodiment of the invention.

Similar parts have been similarly designated in the two views.

Only so much of a compressor has been shown as will afford a clear understanding of my invention.

As shown in Figure 1, a housing 10, only a portion of which is shown, completely encloses the compressor and forms a working space therefor. Internal ribs 12 and 14 are provided which serve to support bearings 16 and 18 respectively. An eccentric shaft 20 is mounted for rotation in bearings 16 and 18. However, as will be understood my improved lubricating system is equally applicable to compressors utilizing crankshafts.

Eccentric shaft 20 is provided with eccentrics 22 having connecting rods 24 rotatably supported thereon. Pistons 26 are attached to the connecting rods 24 by way of the usual wrist pins 28. Rotation of a shaft 20 imparts a reciprocatory movement to pistons 26, all as is well understood in the art.

Shaft 20 has an axial oil receiving bore 30 formed therein which communicates with an oil collection trough 32 by way of pipe line 34. A spring 36 serves to maintain shaft 20 and pipe line 34 in sealed relationship. Radial oil delivery ports 38 are provided in a wall of shaft 20 to provide communication between bore 30 and bearings 16 and 18. Similar oil delivery ports 40 communicate bore 30 with the bearing surfaces of the connecting rods 24 and by way of elongated passageway 42 with the wrist pins 28.

An oil slinger 44 is mounted on shaft 20 for rotation therewith and serves to pick up oil 46, contained in an oil sump (not shown) formed in housing 10, for delivery to trough 32. The oil then flows by way of gravity through pipe line 34 to bore 30 and therethrough from whence it is forced by centrifugal force through ports 38 and 40 to the various bearing surfaces.

Shaft 20 is provided with a radial passageway at an exposed portion thereof and at a point as far remove as is practicable from the inlet end of the bore, in which passageway a tube 48 is press fitted. In this connection it should be noted that bore 30 terminates at point just beyond the furthermore oil delivery port and tube 42 should be positioned as close as is practicable the terminal point of bore 30. Tube 48 has one end flush with the surface of shaft 20 and its other end extending into bore 30 to substantially the centre portion thereof. Tube 48 serves to vent refrigerant gases released from the oil and trapped in the interior of bore 30 by oil forced around the periphery of the bore by centrifugal force created through the rotation of shaft 20. At the same time however, due to the fact that the oil is so forced, it is prevented from passing out tube 48.

I am aware that prior patents have shown tube extending into the interior of a drilled crankshaft. For example, the patent to Chilton, No. 1,674,191, shows such a construction for the purpose, however, of preventing impurities from passing out of the crankshaft to the bearing surface. The Chilton patent, further, relates internal combustion engines where there is no such problem of gas pockets being formed. Still further a force feed lubrication system is utilized which would force through the shaft even if the problem was present. my knowledge however, no such construction was known before my invention for the purpose of venting gases released from the circulating oil.

The compressor shown in Figure 2, is similar to F ure 1, showing, however, a method of attaching a motor to the eccentric shaft 20 for rotating it, and a modified form of venting arrangement.

The motor, shown somewhat diagrammatically, comprises a rotor 52, end rings 54 and a rotor sleeve 56. It will be appreciated that rotor 52, rings 54 and sleeve 56 rotate in unison. Shaft 20 is adapted to be rotated by sleeve 56 by way of a key 58 fitting into a keyway 60 formed jointly in shaft 20 and sleeve 56. A thrust washer 62 is provided and is lubricated by oil working its way between bearing 18 and shaft 20. As is noted, bore 30 is extended to run the entire length of shaft 20 and a cap screw 64 is threaded into the extension for the purpose of maintaining motor 50 and shaft 20 in assembled relationship.

As an alternative to the construction shown in Figure 1 for venting gas from the interior of bore 30, cap screw 64 is centrally drilled as at 66 to provide a vent means. As can be readily appreciated, gas accumulated in the interior of bore 30 will readily escape via passageway 66 but at the same time the peripherally forced oil will not pass therethrough.

It will be understood that the invention is not to be limited to the specific construction or arrangement of parts shown, but that they may be widely modified within the invention defined by the claim.

What is claimed is:

A refrigerant compressor comprising a housing containing a body of lubricant therein, said housing including means forming a working space for a compression means; a horizontal shaft having an axial lubricant-receiving bore of uniform diameter formed therein, said shaft further including a plurality of radial ports and a passageway radial throughout its extent and formed through a wall thereof; a plurality of bearings mounted in said housing receiving said shaft for rotation, said bearings each confining a respective radial port; a lubricant-receiving trough communicating with said lubricant-receiving bore; slinger means attached to said shaft for delivering lubricant from said body thereof to said trough, said lubricant flowing from said trough axially of said bore and thence radially through said ports to said bearings; means communicating with said lubricant receiving bore for venting gases trapped therein, said venting means comprising a tube open at both ends fitted in said radial passageway and terminating at one end thereof substantially centrally of said bore for preventing the passage therethrough of said lubricant and communicating at the other end thereof with the interior of said housing; a motor in said housing for rotating said shaft; and compression means mounted for movement in said working space and driven by said shaft.

References Cited in the file of this patent

UNITED STATES PATENTS

| | | |
|---|---|---|
| 1,955,958 | Greenwald | Apr. 24, 1934 |
| 1,965,198 | Maccabee | July 3, 1934 |
| 2,035,276 | Replogle | Mar. 24, 1936 |
| 2,100,799 | Drysdale | Nov. 30, 1937 |
| 2,298,749 | Buschmann | Oct. 13, 1942 |
| 2,300,973 | Rogers | Nov. 3, 1942 |
| 2,337,291 | Adams et al. | Dec. 21, 1943 |
| 2,423,719 | Muffly | July 8, 1947 |
| 2,563,550 | Quist | Aug. 7, 1951 |

FOREIGN PATENTS

| | | |
|---|---|---|
| 509,467 | Germany | Oct. 8, 1930 |